3,254,125
PREPARATION OF AMINODIPHENYL
SULFIDES
Joseph Levy, Paramus, N.J., and James Psihas, New York, N.Y., assignors to Universal Oil Products Company, Des Plaines, Ill., a corporation of Delaware
No Drawing. Filed Nov. 29, 1963, Ser. No. 327,060
11 Claims. (Cl. 260—580)

This application relates to a process for the preparation of aminodiphenyl sulfides and more particularly to a process whereby improved yields of the desired products are obtained.

Heretofore, the prior art has disclosed a number of different methods of reducing nitrodiphenyl sulfide compounds to the corresponding amines. For example, it is known to use a combination of iron and sulfuric acid; a combination of zinc or tin plus an acid; stannous chloride plus hydrochloric acid; or catalytic reduction utilizing known reduction catalysts. However, each one of these prior art methods possess disadvantages which are either operational in nature, involving tedious and cumbersome procedures, or the yields, which are obtained by utilizing these processes, are relatively low thus adversely affecting the commercial operations from an economic standpoint.

For example, when utilizing iron plus sulfuric acid as the reducing agent, it is often found difficult to carry out the reaction on an industrial scale due to serious filtration problems in isolating the products from iron sludges which are formed during the process. In addition, operational hazards are encountered due to the pyrophoric nature of the iron sludges. The other chemical reducing agents or catalytic methods which have been employed for the reduction likewise possess similar drawbacks.

It is well known to use inorganic sulfides, particularly alkali metal or ammonium sulfides or polysulfides as reducing agents for the conversion of nitro compounds to amines. However, this method has found little application for the reduction of nitrodiphenyl sulfides. The reason for this is apparent when such reductions are attempted. Yields of approximately only 50% to 55% are obtained when the reaction is conducted according to conventional procedure at relatively elevated temperatures (i.e., reflux conditions). We have now found however, that excellent yields of such aminodiphenyl sulfides in a state of high purity are obtained when such inorganic sulfide reductions are conducted according to a novel sequence of reaction conditions. Furthermore, we have found that equally superior results and additional economies in the preparation of aminodiphenyl sulfides are effected when thiophenols are reacted with ortho- or parahalo-nitrobenzene compounds and the reaction mixture containing the nitrodiphenyl sulfide compound so produced is treated directly, without isolation of the latter product, with an inorganic sulfide according to the novel procedure of this invention.

The object of this invention is to provide a novel process for obtaining relatively high yields of the desired pure products when reducing nitrodiphenyl sulfides to the corresponding aminodiphenyl sulfides using an inorganic sulfide as the reducing agent, said reduction being effected in a definite sequence of reaction conditions, especially conditions of temperature.

Taken in its broadest aspect, one embodiment of this invention resides in a process for the preparation of an aminodiphenyl sulfide which comprises first partially reducing a nitrodiphenyl sulfide in the presence of an inorganic sulfide at a temperature in the range of from about 5° to about 30° C., thereafter effecting further reduction at an elevated temperature, and recovering the desired aminodiphenyl sulfide.

Another embodiment of this invention is found in a process for the preparation of an aminodiphenyl sulfide which comprises reacting a thiophenol with a compound selected from the group consisting of ortho- and parahalonitrobenzenes and substituted products thereof in the presence of an alkaline material, partially reducing the resultant nitrodiphenyl sulfide in the reaction mixture by the addition of an inorganic sulfide at a temperature in the range of from about 5° to about 30° C., thereafter effecting further reduction at an elevated temperature, and recovering the desired aminodiphenyl sulfide.

Yet another embodiment of this invention is found in a process for the preparation of an aminodiphenyl sulfide which comprises first partially reducing a nitrodiphenyl sulfide in the presence of sodium sulfide in a solvent system selected from the group consisting of organic solvents and aqueous-organic solvents at a temperature in the range of from about 5° to about 30° C., thereafter effecting further reduction at an elevated temperature and recovering the desired aminodiphenyl sulfide.

A specific embodiment of this invention resides in a process for the preparation of an aminodiphenyl sulfide which comprises first partially reducing 2'-chloro-2-nitro-4-methylmercaptodiphenyl sulfide in the presence of an excess of sodium sulfide in an aqueous-organic solvent system comprising aqueous methyl alcohol at a temperature in the range of from about 20° to about 30° C., thereafter effecting further reduction at a temperature in the range of from about 45° to about 70° C., and recovering the desired 2'-chloro-2-amino-4-methylmercaptodiphenyl sulfide.

Another specific embodiment of this invention is found in a process for the preparation of an aminodiphenyl sulfide which comprises reacting o-chlorothiophenol with 4-chloro-3-nitrothioanisole in the presence of potassium carbonate and an aqueous organic solvent comprising aqueous methyl alcohol at a temperature in the range of from about 45° to about 70° C. partially reducing the resultant 2'-chloro-2-nitro-4-methylmercaptodiphenyl sulfide in the presence of an excess of sodium sulfide at a temperature in the range of from about 20° to about 30° C., thereafter effecting further reduction at a temperature in the range of from about 45° to about 70° C., and recovering the desired 2'-chloro-2-amino-4-methylmercaptodiphenyl sulfide.

Other objects and embodiments will be found in the following further detailed description of this invention.

As hereinbefore set forth, it has now been discovered that improved yields of a desired aminodiphenyl sulfide may be obtained when reducing the corresponding nitrodiphenyl sulfide in the presence of an inorganic sulfide, said higher yields being obtained by utilizing a particular and novel sequence of operating conditions. The preferred aminodiphenyl sulfides which are obtained according to the process of this invention possess the generic formula:

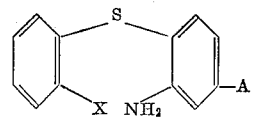

in which X is a halogen and preferably chlorine or bromine and A is selected from the group consisting of hydrogen and lower alkyl, alkoxy, halogen, alkylthio, alkylsulfonyl, dialkylamino, dialkylaminoalkyl, trifluormethyl, trifluormethylsulfonyl, and dialkylsulfamoyl groups. These aminodiphenyl sulfides find a wide variety of uses particularly as intermediates for the preparation of phenothiazine derivatives which are valuable in the medicinal or pharmaceutical field as tranquilizing agents. The preferred compounds as shown in the above generic formula comprise those in which the halogen is in a position ortho to the sulfur bridge atom and the amino group which is the result of the reduction of a nitro group is also in a position ortho to the sulfur bridge atom on the other ring of the diphenyl sulfide compound. In addition, compounds which are particularly desired as intermediates for preparing phenothiazine derivatives having tranquilizing activity also contain a substituent, denoted as A in the above generic formula, which is in a position para to the sulfur bridge atom and meta to the amino group on the ring containing said amino group. The aromatic rings may also be further substituted with the radicals encompassed in the group A. While the process of this invention is particularly valuable for reducing nitrodiphenyl sulfides to aminodiphenyl sulfides having the preferred configuration, hereinbefore described, it is also applicable to nitrodiphenyl sulfides having the nitro group in other positions in the aromatic rings such as in the para position as would be obtained by the reaction of a thiophenol with a para-halonitrobenzene.

In the preferred process of the invention, the nitrodiphenyl sulfide reactant has the structural formula

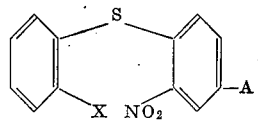

in which X is chloro or bromo and A is selected from the group consisting of hydrogen, lower alkyl, lower alkoxy, chloro, bromo, lower alkylthio, lower alkylsulfonyl, di-lower-alkylamino, diloweralkylamino - loweralkyl, trifluoromethyl, trifluoromethylsulfonyl and diloweralkylsulfamoyl.

As heretofore mentioned, the prior art methods of preparing these compounds suffer from many drawbacks contributing to increased costs of manufacturing. However, when utilizing the process of the present invention, it is possible to obtain yields of up to about 90% or more of theory as well as to effect considerable savings in operational costs. Thus, it is readily apparent that the method of this invention presents many advantages over the prior art procedures.

The desired nitrodiphenyl sulfide of the preferred structure is prepared according to well known methods by reacting an ortho-halo substituted thiophenol with an ortho-halo substituted nitrobenzene compound. This reaction is effected in an organic solvent in the presence of an alkaline agent such as an alkali metal hydroxide or carbonate. If so desired, the medium in which the reaction is effected may contain some water as, for example, an aqueous methanol solvent. The preferred solvent for the purpose of subsequently reducing the nitrodiphenyl sulfide according to the process of this invention is methanol or aqueous methanol. The condensation reaction takes place at an elevated temperature usually at the reflux temperature of the reaction medium. Examples of halo substituted thiophenols which may be used include o-chlorothiophenol and o-bromothiophenol. It is contemplated within the scope of this invention that ortho-halo substituted thiophenols containing other substituents such as alkyl radicals including methyl, ethyl, n-propyl, isopropyl, alkoxy radicals such as methoxy, ethoxy, and other halogen radicals, which, in effect, would constitute a dihalo substituted thiophenol such as 2,4-dichlorothiophenol, 2,4-dibromothiophenol, may also be utilized. It is also contemplated within the scope of this invention that thiophenols lacking an ortho-halo substituent may also be utilized. Examples of ortho- and para-halo substituted nitrobenzenes which may be used include 2-chloronitrobenzene, 4-chloronitrobenzene, 2-bromonitrobenzene, 4-chloro-3-nitroanisole, 4-chloro-3-nitroethoxybenzene, 4-chloro-3-nitrothioanisole, 4-chloro-3-nitrothiophenetole, 4-chloro-3-nitropropoxybenzene, 1,4-dichloro - 3 - nitrobenzene, 1,4-dibromo-3-nitrobenzene, 4-chloro - 3 - nitrotoluene, 4-chloro-3-nitroethylbenzene, 4-chloro-3-nitrobenzotrifluoride, 4-bromo - 3 - nitrodimethylaniline, 4-chloro-3-nitrophenyl methyl sulfone. It is to be understood that the aforementioned examples of ortho-halo substituted thiophenols and ortho- and para-halo substituted nitrobenzenes are only representatives of the class of compounds which may be used and that the present invention is not necessarily limited thereto.

The halonitrodiphenyl sulfides which result from the aforementioned reaction between the ortho-halo substituted thiophenol and the ortho- or para-halo substituted nitrobenzene may then be isolated and reduced to the desired aminodiphenyl sulfide or may be reduced without prior separation and purification by treating with a reducing agent comprising an inorganic sulfide in the presence of an organic solvent or aqueous-organic solvent utilizing a novel sequence of operating conditions of temperature. Reducing agents which may be used according to the process of this invention include sodium sulfide, potassium sulfide, lithium sulfide, sodium hydrosulfide, sodium disulfide, potassium disulfide, sodium polysulfide, potassium polysulfide, ammonium sulfide. The aforesaid sulfides are preferably employed in excess of from about 50% to about 200%, the preferred range being from about 100% to about 150% of the theoretical amount, in order to obtain maximum yields. The inorganic sulfide is preferably added to the reaction mixture in aqueous solution but can also be added in the solid form in which case the reaction may be prolonged. In addition, it is contemplated within the scope of this invention that an alkaline substance may be added to the reaction mixture, said alkaline materials including sodium hydroxide, potassium hydroxide, sodium carbonate, potassium carbonate, etc. The addition of such alkaline materials appears to facilitate the reaction and to produce slightly higher yields, but is not essential to the success of the reaction.

The reduction of the nitrodiphenyl sulfide to the corresponding aminodiphenyl sulfide is preferably carried out in a lower alcohol or aqueous alcoholic solvent system, said media including methyl alcohol, ethyl alcohol, n-propyl alcohol, isopropyl alcohol or aqueous solutions thereof. It is also contemplated that other solvents such as tetrahydrofuran, dimethylformamide, dioxane, dimethoxyethane, etc., or mixed solvent systems may also be employed but not necessarily with equivalent results. A particularly advantageous solvent system is aqueous methanol containing about 10% tetrahydrofuran.

In order to obtain a relatively high yield which will render the process economically attractive to operate, that is, yields of 90% or greater of the theory, the reduction of the nitrodiphenyl sulfide to the corresponding aminodiphenyl sulfide is accomplished in two stages by utilizing a certain sequence of operating conditions of temperature. This is necessary for the obtention of the desired yields. The initial stage comprises a partial reduction of the nitrodiphenyl sulfide and is accomplished by treating the particular nitrodiphenyl sulfide with an inorganic sulfide, preferably sodium sulfide, in a medium of the type hereinbefore set forth at relatively low temperatures ranging from about 5° to about 30° C. for a period of from about 2 to about 6 hours. The conclusion of this initial stage of the reduction is evidenced by complete dissolution of the initially poorly soluble nitro compound. At these temperatures however further reduction to the amine, proceeds slowly and incompletely. However, it has been found that if after completion of the first stage of the reaction the temperature is then elevated, preferably to reflux, separation of the aminodiphenyl sulfide compound commences shortly thereafter and is concluded in a few hours to give yields of up to about 90% of theory. The initial low temperature stage of the reaction is usually completed in about 2 to 6 hours. A prolonged reaction time at low temperature produces no adverse effects but offers no advantage and is unnecessary. In certain cases, depending upon the solvent system used, the nature of the inorganic sulfide reducing agent, and other factors of the process, the completion of the first stage of the reduction may require longer periods of time. The reflux temperature to which the mixture is raised to accomplish further reduction to the amine will range from about 65° C. when methyl alcohol is used as the solvent to about 85° C. when utilizing ethyl alcohol or other solvent. However, it is not essential for the success of the reaction to raise the temperature as high as the reflux point. Thus, the reaction temperature which is used to effect the second stage of the reduction should be elevated sufficiently to cause further reduction to the amine to proceed at a satisfactory rate and preferably is raised as high as the reflux temperature of the solvent system employed in order to conclude the reaction in the shortest possible time. The excellent results achieved by this two stage procedure are quite unexpected and in marked contrast to the approximately 50% yields obtained when the reaction is conducted throughout at elevated or reflux temperatures. Under these conditions it is found that none of the nitro compound is recoverable from the reaction mixture indicating that it has been completely reduced or otherwise reacted. A possible explanation regarding the course of the reaction, seems to be that at such elevated temperatures, the low yields of aminodiphenyl sulfide compound are due to losses produced by competing side reactions, probably involving scission of the sulfide linkage, which are promoted by the nitro group in the molecule. At relatively low temperatures, however, according to the conditions of the initial stage of our process, such undesirable side reactions are minimized while the nitro group appears to be partially reduced to an undetermined intermediate reduction state. This is evidenced by the absence of the characteristic absorption at 7.5 microns for the nitro group in the infrared spectrum of the reaction product isolated after completion of this stage of the reaction. The elimination of the nitro group then permits further reduction to the amine at elevated temperatures to take place rapidly and completely affording high yields of up to about 90% or greater. It is of interest to note that yields of only about 75% of theory are obtained when the first stage of the reaction is carried out at intermediary temperatures of about 45°–50° C. and the reaction then completed at reflux. From these data, it is clear that the desired high yields cannot be attained by carrying out the reaction for prolonged periods entirely at low temperatures or entirely at either intermediate or reflux temperatures, but only by first effecting partial reduction at low temperature as described hereinbefore followed by further reduction to the amine at elevated temperatures. Of course, the second stage of the reduction may also be conducted at intermediate temperatures of about 45°–50° C. or higher rather than at reflux, but the reaction time will be increased and no advantage is gained thereby.

The preferred method of effecting this reaction is the batch type in which the required quantities of the ortho-halo substituted thiophenol, the ortho- or para-halo substituted nitrobenzene, the alkaline agent and the solvent are placed in an appropriate apparatus provided with heating, stirring and reflux means. If desired, an inert gas such as nitrogen is passed in whereby said reaction is effected in an inert atmosphere. The use of an inert atmosphere, however, is not necessary to the success of the reaction. The apparatus is heated to the desired temperature, i.e. reflux temperature of the solvent system, and maintained at this temperature for a predetermined residence time to effect formation of the halonitrodiphenyl sulfide compound. Upon completion of the desired reaction time, heating is discontinued and the reaction mixture allowed to return to room temperature. The amount of solvent is then adjusted to that desired for the subsequent reduction, followed by the gradual addition of the reducing agent comprising the inorganic sulfide within a temperature range of from about 5° to 30° C. The reaction apparatus and contents thereof are then maintained at the aforementioned temperature range for a period of from about 2 to about 6 hours until the first stage of the reduction is concluded. At the end of this time the apparatus and contents thereof are then heated preferably to the reflux temperature of the solvent system and maintained thereat for an additional period of from about 1 to about 4 hours whereupon separation of the desired amino compound takes place. At the end of this time the apparatus and contents thereof are again allowed to cool to room temperature, the crystallized reaction product is separated by filtration, washed with an aqueous alcoholic solution and then water and dried. The aminodiphenyl sulfide is obtained in a high state of purity but, if desired, may be recrystallized from a suitable solvent.

Examples of aminodiphenyl sulfides which may be prepared according to the process of this invention include 2'-chloro-2-aminodiphenyl sulfide,
2',4-dichloro-2-aminodiphenyl sulfide,
2'-bromo-2-aminodiphenyl sulfide,
2',4-dibromo-2-aminodiphenyl sulfide,
2'-chloro-2-amino-4-methoxydiphenyl sulfide,
2'-chloro-2-amino-4-ethoxydiphenyl sulfide,
2'-chloro-2-amino-4-methyldiphenyl sulfide,
2'-chloro-2-amino-4-methylmercaptodiphenyl sulfide,
2'-chloro-2-amino-4-ethylmercaptodiphenyl sulfide,
2'-chloro-2-amino-4-methylsulfonyldiphenyl sulfide,
2'-chloro-2-amino-4-dimethylaminodiphenyl sulfide,
2'-bromo-2-amino-4-methylmercaptodiphenyl sulfide,
2'-bromo-2-amino-4-ethylmercaptodiphenyl sulfide,
2'-chlor-2-amino-4-trifluormethyldiphenyl sulfide,
2'-chlor-4-aminodiphenyl sulfide, etc.

It is to be understood that the aforementioned compounds are only representatives of the class of compounds which may be obtained and the process of this invention is not necessarily limited thereto.

The following examples are given to illustrate the process of the present invention which, however, are not intended to limit the generally broad scope of the present invention in strict accordance therewith.

*Example I*

15.6 grams of 2'-chloro-2-nitro-4-methylmercaptodiphenyl sulfide (which was prepared in 93–4% yield from the reaction of o-chlorthiophenol with 4-chlor-3-nitrothioanisole in aqueous methanol in the presence of potassium carbonate), 72 grams of methyl alcohol, and 8 grams of tetrahydrofuran were placed in a reaction vessel provided with heating and refluxing means. A warm solution comprising 25 grams of technical grade sodium sulfide plus 7.5 grams of sodium hydroxide and 48 grams of water was slowly added dropwise during a period of 1 hour at a temperature of about 25° C. to the reaction mixture. Upon completion of the addition, the reaction mixture was stirred for an additional 5 hours at room temperature (25° C.). Reaction took place with gradual disappearance of the original reddish-brown color of the mixture and complete dissolution of the organic material in about 2 hours to give a light brown solution. The resulting solution was then heated to reflux (temperature of about 74° C.), separation of the amino compound taking place shortly thereafter as an oil, and maintained for a period of 2 hours. On cooling, crystallization of the oily product occurred at about 57° C. The desired product comprising 2'-chloro-2-amino-4-methylmercaptodiphenyl sulfide was filtered at about 25° C., washed with cold 50% aqueous methanol and then water and dried. There were obtained 12.9 grams (91.5% of theory) having a melting point of 91.5–93° C.

*Example II*

This example is illustrative of the preparation of a nitrodiphenyl sulfide and subsequent reduction to the corresponding amine without isolation of the nitro compound.

A mixture of 15.7 grams of o-chlorothiophenol, 20.4 grams of 4-chloro-3-nitrothioanisole, 15.2 grams of powdered potassium carbonate in a solvent comprising 89 grams of methyl alcohol and 8.5 grams of water was heated to a reflux temperature of about 65° C. and maintained at this temperature for a period of about 4.5 hours. In addition, the reaction was effected under an inert atmosphere which was provided for by the introduction of nitrogen to the reaction vessel. At the completion of the reaction time, the mixture was then allowed to cool to room temperature whereupon yellow crystals of 2'-chloro-2-nitro-4-methylmercaptodiphenyl sulfide precipitated out.

The nitrogen addition was discontinued and an additional 55 grams of methyl alcohol and 16 grams of tetrahydrofuran were then added. Following this, a warm solution of 50 grams of sodium sulfide (technical grade, 59.5%) plus 15 grams of sodium hydroxide in 95 grams of water was added dropwise during a period of about 1 hour while the temperature of the solution was maintained at about 25° C. Upon completion of the dropwise addition of the reducing agent, the mixture was continuously stirred for an additional period of 5 hours while the mixture was maintained at a temperature of about 25° C. It was noted that reaction took place with the gradual disappearance of the initial reddish-brown color of the mixture and complete solution of the organic material present in about 2 hours to give a brown solution containing inorganic salts suspended therein. The reaction mixture was then heated to reflux temperature and maintained thereat for a period of about 2 hours. During this time it was noted that the separation of 2'-chloro-2-amino-4-methylmercaptodiphenyl sulfide as an oil took place. The reaction mixture was then allowed to cool to room temperature, the oil crystallizing at about 57° C. Separation of the crystals was effected by filtration at room temperature (25° C.) following which the crystals were washed with a cold 50% methyl alcohol-water solution and then with water to dissolve inorganic salts. The crystals comprising 2'-chloro-2-amino-4-methylmercaptodiphenyl sulfide were dried to yield 24.2 grams (85.7% overall yield calculated on o-chlorthiophenol) of the desired product, said crystals having a melting point of 91–92.5° C. Since the yield in the preparation of the nitro compound is about 93–4% of theory, the yield in the reduction step is about 91–2% of theory in this experiment.

*Example III*

In this example the desired product, as hereinbefore shown in greater detail, was prepared utilizing an aqueous solution of sodium sulfide as the reducing agent without the addition of any added alkaline material.

A reaction mixture comprising 31.2 grams of 2'-chloro-2-nitro-4-methylmercaptodiphenyl sulfide in 144 grams of methyl alcohol was placed in a reaction vessel. A warm solution of 50 grams of sodium sulfide in 80 grams of water was added dropwise during a period of 1 hour at a temperature of about 25° C. Following this, stirring was maintained for an additional period of 5 hours at 25° C., the organic material completely dissolving after about 3 hours of stirring and after an additional period of 0.5 hour a voluminous precipitate (of unknown composition) separated out. The reaction mixture was then heated up to reflux (about 65° C.) whereupon the precipitate completely redissolved. Shortly thereafter the desired product comprising 2'-chloro-2-amino-4-methylmercaptodiphenyl sulfide began to separate as an oil which gradually crystallized. The reaction mixture was maintained at reflux temperature for about 2 hours following which the reaction mixture was then allowed to cool to room temperature. The crystalline product was filtered, washed with a methyl alcohol-water solution and then with water and dried. The crystals obtained (in 87.8% yield) had a melting point of about 92–93.5° C.

*Example IV*

This example illustrates yet another variation in which the reducing agent utilized was in a solid form and methanol was used as the solvent.

A mixture of 15.6 grams of 2'-chloro-2-nitro-4-methylmercaptodiphenyl sulfide, which comprises the crude product as isolated from the reaction of 2-chlorothiophenol and 4-chloro-3-nitrothioanisole in a methyl alcohol-sodium hydroxide solution, was suspended in 72 grams of methyl alcohol. Following this 25 grams of solid sodium sulfide were added thereto. The moderately exothermic reaction which ensued was controlled by cooling the reaction mixture while continuously stirring. The reaction mixture was then allowed to stand at room temperature (25° C.) for a period of about 20 hours, following which it was refluxed at a temperature of about 65° C. for a period of about 2 hours. After this, 40 grams of water were added and refluxing was continued for another 0.5 hour. The oil, which precipitated out during the reaction, formed crystals upon cooling to yield 12.6 grams of 2'-chloro-2-amino-4-methylmercaptodiphenyl sulfide (89.3% of theory) which melted at 90.5–92.5° C.

*Example V*

In this example 2'-chloro-2-nitro-4-methylmercaptodiphenyl sulfide was reduced using an aqueous solution of sodium sulfide plus caustic soda in the presence of ethyl alcohol as a reaction medium. A warm solution of 25 grams of sodium sulfide plus 7.5 grams of sodium hydroxide dissolved in 48 grams of water was slowly added dropwise during a period of 1 hour to a mixture of 15.6 grams of 2'-chloro-2-nitro-4-methylmercaptodiphenyl sulfide (this being the crude product as isolated from the reaction of o-chlorothiophenol and 4-chloro-3-nitroanisole in an alkaline methyl alcohol solution) in 72 grams of ethyl alcohol at a temperature of about 25° C. Upon completion of the addition of the reducing agent the reaction mixture was allowed to stand at room temperature (25° C.) for a period of about 20 hours. Following this the reaction mixture was then heated to reflux temperature (about 80° C.) and refluxed for a period of 2 hours. At the end of this time the reaction mixture containing the crystalline 2'-chloro-2-amino-4-methylmercaptodiphenyl sulfide was cooled, the crystals filtered, washed with ethyl alcohol, an ethyl alcohol-water mixture and then water and dried. The crystals (obtained in a 79.5% yield) melted at 91–93° C.

*Example VI*

In this example the reducing agent comprises an aqueous solution of sodium disulfide and caustic soda. A mixture of 15.6 grams of 2'-chloro-2-nitro-4-methylmercaptodiphenyl sulfide in 72 grams of methyl alcohol was placed in a reaction vessel. A warm solution of 25 grams of sodium sulfide, 48 grams of water, 7.5 grams of sodium hydroxide and 6 grams of sulfur was slowly added dropwise during a period of 1 hour while maintaining the temperature of the reaction mixture at 25° C. Upon completion of the addition of the reducing agent, stirring was maintained at 25° C. for an additional period of 5 hours during which time most of the organic material gradually dissolved with the subsequent appearance of a fine crystalline precipitate. Following this the reaction mixture was heated to reflux, the bulk of the initial precipitate dissolving. The desired product comprising 2'-chloro-2-amino-4-methylmercaptodiphenyl sulfide then separated as an oil while the reaction mixture was being refluxed for a period of 2 hours. Upon cooling the desired product crystallized, the crystals being filtered, washed with methyl alcohol and water, and dried. The desired crystals were found to have a melting point of 91.5–92° C.

*Example VII*

In this experiment the reducing agent comprised an aqueous solution of sodium hydrosulfide using a methanol-tetrahydrofuran mixture as the reaction medium. A solution of 15.1 grams of sodium hydrosulfide and 17.5 grams of water was slowly added dropwise during a period of 1 hour to a mixture of 15.6 grams of 2′-chloro-2-nitro-4-methylmercaptodiphenyl sulfide in 72 grams of methyl alcohol and 8 grams of tetrahydrofuran, the temperature being maintained at about 25° C. Upon completion of the addition of the reducing agent, stirring was continued for a period of about 5 hours while maintaining the temperature at 25° C. Following this the resulting solution was refluxed for a period of 2 hours during which time the product separated as an oil. Upon completion of the reflux the reaction mixture was allowed to cool, the desired 2′-chloro-2-amino-4-methylmercaptodiphenyl sulfide which had crystallized upon cooling was filtered, washed with methyl alcohol-water and then water and dried. The crystals obtained by this method had a melting point of 90–91.5° C.

*Example VIII*

This example was run to illustrate the relatively low yields obtained when the reaction is carried out entirely at elevated or reflux temperatures. A mixture of 15.6 grams of 2′-chloro-2-nitro-4-methylmercaptodiphenyl sulfide and 72 grams of methanol was heated and a warm solution of 25 grams of sodium sulfide in 40 grams of water was slowly added dropwise during a period of about 1 hour while maintaining the temperature of the mixture in a range of from about 64° to about 74° C. Upon completion of the addition of the reducing agent, the reaction mixture was maintained at reflux temperature for an additional period of 2 hours. During this time the desired product comprising 2′-chloro-2-amino-4-methylmercaptodiphenyl sulfide separated out as an oil. After completion of the residence time, the mixture was allowed to cool to room temperature, the desired product crystallizing. The crystals were filtered, washed with a water-methyl alcohol solution, then water and dried. There was obtained 7.6 grams of 2′-chloro-2-amino-4-methylmercaptodiphenyl sulfide which melted at 90.5–93° C. It should be noted that the yield comprised only 54% of theory as contrasted with the above yields of up to about 90% which were obtained when effecting the reaction initially at a low temperature of from about 5° to about 30° C. for a period of from about 2 to about 6 hours and thereafter elevating the temperature to complete the reduction.

*Example IX*

This experiment was also performed to illustrate the low yields obtained when conducting the reaction entirely at low temperatures. A mixture of 15.6 grams of 2′-chloro-2-nitro-4-methylmercaptodiphenyl sulfide, which was recovered as the crude product when isolated from the reaction of o-chlorothiophenol and 4-chloro-3-methylthioanisole in an alkaline methyl alcohol solution, and 72 grams of methyl alcohol were placed in a reaction apparatus. A warm solution of 20 grams of sodium sulfide and 6 grams of sodium hydroxide dissolved in 37 grams of water was slowly added dropwise to the mixture during a period of 1 hour while maintaining the temperature at 25° C. Upon completion of the addition of the reducing agent the reaction mixture was allowed to stand at room temperature (25° C.) for an additional period of about 20 hours. The crystalline material comprising 2′-chloro-2-amino-4-methylmercaptodiphenyl sulfide which separated out was filtered, washed with methyl alcohol, and then water and dried. There was obtained 7.5 grams of the desired product having a melting point of 89–90° C., said yield being only 53% of the theory.

Upon repeating the above experiment the reaction was allowed to stand for a period of 52 hours, there being obtained crystals having a melting point of 87.5–90° C., in only a yield of 63%.

*Example X*

In this example o-chlorothiophenol and o-chloronitrobenzene in an alkaline methyl alcohol solution were reacted in a manner similar to that set forth in Example II. The desired product comprising 2′-chloro-2-nitrodiphenyl sulfide which resulted from this reaction was separated and recovered in a manner also similar to that hereinbefore set forth.

A solution of the 2′-chloro-2-nitrodiphenyl sulfide and 62 grams of methyl alcohol were placed in a reaction vessel. A solution of 20 grams of sodium sulfide dissolved in 32 grams of water was added dropwise during a period of 1 hour with constant stirring while maintaining the temperature at 25° C. Upon completion of the addition of the reducing agent the reaction mixture was stirred for an additional period of 1 hour at 25° C. after which time a considerable amount of insoluble material was still present. Following this 6.4 grams of tetrahydrofuran and 12 grams of a 50% sodium hydroxide solution were added and the reaction mixture was maintained at 25° C. for an additional period of 20 hours during which time the organic material was completely dissolved. The reaction mixture was then heated to reflux temperature and refluxed for an additional period of 2 hours. The desired product comprising 2′-chloro-2-aminodiphenyl sulfide, which separated out as an oil from the hot reaction mixture, crystallized when the reaction mixture was allowed to cool to room temperature. The crystalline product was filtered, washed with methyl alcohol, excess water and dried. There was obtained 8.0 grams of the desired product (85% of theory) said crystals melting at 77–78.5° C.

*Example XI*

In this example o-chlorothiophenol and 1,4-dichloro-2-nitrobenzene in an alkaline methyl alcohol solution were reacted in a manner similar to that set forth in Example II above. The desired product comprising 2′,4-dichloro-2-nitrodiphenyl sulfide resulting from this reaction was separated and recovered.

A warm solution of 25 grams of sodium sulfide in 40 grams of water was slowly added dropwise with continuous stirring during a period of 1 hour at 25° C. to a mixture of 15.2 grams of 2′,4-dichloro-2-nitrodiphenyl sulfide in 72 grams of methyl alcohol. Upon completion of the addition of the reducing agent the reaction mixture was maintained at 25° C. for a period of about 2 hours with continuous stirring. At the end of the 2 hours, the organic material had completely dissolved following which the mixture was allowed to stand for about 20 hours and was then refluxed for a period of 2 hours. The desired product comprising 2′-4-dichloro-2-aminodiphenyl sulfide separated as an oil which later crystallized when the reaction mixture was cooled. The crystalline 2′,4-dichloro-2-aminodiphenyl sulfide was filtered, washed with cold methyl alcohol, then water, and dried. There was obtained 12.0 grams of the desired product (90% yield) which melted at 85–86° C.

*Example XII*

In this example o-bromothiophenol is reacted with 4-chloro-3-nitroanisole in a manner similar to that set forth in Example I above. The resulting 2′-bromo-2-nitro-4-methoxydiphenyl sulfide which results from this reaction is separated and recovered. A solution of sodium sulfide dissolved in water with a small amount of sodium hydroxide is slowly added dropwise to a solution of the 2′-bromo-2-nitro-4-methoxydiphenyl sulfide in methyl alcohol during a period of about 1 hour while maintaining the temperature of the reaction mixture at about 25° C. Following this the reaction mixture is continuously stirred for an additional period of 5 hours and thereafter heated to a temperature approximately the reflux temperature of the methyl alcohol solvent. After a period of about 2 hours the reaction mixture is allowed to cool to room temperature, the desired product comprising 2′-bromo-2-amino-4-methoxydiphenyl sulfide

Example XIII

In this example o-bromothiophenol and 4-chloro-3-nitrobenzotrifluoride are reacted in a manner similar to that hereinabove set forth to yield 2'-bromo-2-nitro-4-trifluormethyldiphenyl sulfide. The latter compound is then reduced by treatment with an excess of sodium sulfide and sodium hydroxide in an organic solvent comprising methyl alcohol also in a manner similar to that hereinbefore set forth, that is, by adding the excess reducing agent to the nitrodiphenyl sulfide and methyl alcohol at a temperature of about 25° C. during a period of about 1 hour while continuously stirring the mixture. The reaction mixture is then maintained at 25° C. for an additional period of about 5 hours with constant stirring. Following this the mixture is then heated to reflux temperature and maintained thereat for a period of about 3 hours, the desred 2'-bromo-2-amino-4-trifluormethyldiphenyl sulfide separating out. At the end of this time the reaction mixture is cooled to room temperature, the desired product crystallizing. The crystals are filtered, washed with methyl alcohol, water and dried.

Example XIV

In this example o-chlorothiophenol and p-chloronitrobenzene are reacted in a manner similar to that hereinbefore set forth to yield 2'-chloro-4-nitrodiphenyl-sulfide. This latter compound is then reduced by treatment with an excess of ammonium sulfide in an organic solvent comprising methyl alcohol; said reduction also being effected in a manner similar to that hereinbefore set forth, that is, by adding the excess of the reducing agent to the 2'-chloro-4-nitrodiphenyl sulfide and the methyl alcohol at a temperature of about 25° C. during a period of about 1 hour while continuously stirring the mixture. This reaction mixture is then maintained at the temperature of about 25° C. for an additional period of about 5 hours while constantly stirring the mixture. At the end of this time the mixture is then heated to reflux temperature and maintained thereat for a period of about 3 hours, the desired 2'-chloro-4-aminodiphenyl sulfide separating out. At the end of the reaction time the mixture is cooled to room temperature, the desired product comprising the aforementioned 2'-chloro-4-aminodiphenyl sulfide crystallizing. The crystals are filtered, washed with methyl alcohol, water and dried.

We claim as our invention:

1. A process for the preparation of an aminodiphenyl sulfide from nitrodiphenyl sulfide having the structural formula

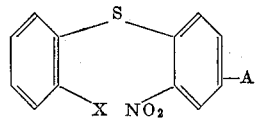

in which X is chloro or bromo and A is selected from the group consisting of hydrogen, lower alkyl, lower alkoxy, chloro, bromo, lower alkylthio, lower alkylsulfonyl, dilower-alkylamino, diloweralkylaminoloweralkyl, trifluoromethyl, trifluoromethylsulfonyl and diloweralkylsulfamoyl, which comprises partially reducing said nitrodiphenyl sulfide with an inorganic sulfide reducing agent selected from the group consisting of the sulfides of sodium, potassium, lithium and ammonium at a temperature in the range of from about 5° to about 30° C., thereafter effecting further reduction at a higher temperature in the range of from about 45° to 85° C., and recovering the corresponding aminodiphenyl sulfide.

2. The process of claim 1 further characterized in that the nitrodiphenyl sulfide is selected from the group consisting of 2'-chloro-2-nitro-4-methylmercaptodiphenyl sulfide, 2'-chloro-2-nitrodiphenyl sulfide, 2',4-dichloro-2-nitrodiphenyl sulfide, 2' - bromo - 2 - nitro-4-methoxydiphenyl sulfide and 2'-bromo-2-mitro-4-trifluoromethyldiphenyl sulfide.

3. The process of claim further characterized in that the inorganic sulfide is present in an amount of from about 50 to about 200% in excess of that theoretically required to reduce said nitrodiphenyl sulfide.

4. The process of claim 1 further characterized in that the reduction of said nitrodiphenyl sulfide is effected in a lower alcohol solvent.

5. The process of claim 1 further characterized in that the reduction of said nitrodiphenyl sulfide is effected in a solvent mixture of a lower alcohol and water.

6. The process of claim 1 further characterized in that the reduction of said nitrodiphenyl sulfide is effected in a solvent mixture of methyl alcohol and water.

7. A process for the preparation of an aminodiphenyl sulfide which comprises partially reducing 2'-chloro-2-nitro-4-methylmercaptodiphenyl sulfide in the presence of an excess of sodium sulfide in an aqueous methanol solvent at a temperature in the range of from about 20° to about 30° C., thereafter effecting further reduction at a temperature in the range of from about 45° to about 70° C., and recovering the resultant 2'-chloro-2-amino-4-methylmercaptodiphenyl sulfide.

8. A process for the preparation of an aminodiphenyl sulfide which comprises partially reducing 2'-chloro-2-nitrodiphenyl sulfide in the presence of an excess of sodium sulfide in an aqueous methanol solvent at a temperature in the range of from about 20° to about 30° C., thereafter effecting further reduction at a temperature in the range of from about 45° to about 70° C., and recovering the resultant 2'-chloro-2-aminodiphenyl sulfide.

9. A process for the preparation of an amino-diphenyl sulfide which comprises partially reducing 2',4-dichloro-2-nitrodiphenyl sulfide in the presence of an excess of sodium sulfide in an aqueous methanol solvent at a temperature in the range of from about 20° to about 30° C., thereafter effecting further reduction at a temperature in the range of from about 45° to about 70° C., and recovering the resultant 2',4-dichloro-2-aminodiphenyl sulfide.

10. A process for the preparation of an aminodiphenyl sulfide which comprises partially reducing 2'-bromo-2-nitro-4-methoxydiphenyl sulfide in the presence of an excess of sodium sulfide in an aqueous methanol solvent at a temperature in the range of from about 20° to about 30° C., thereafter effecting further reduction at a temperature in the range of from about 45° to about 85° C., and recovering the resultant 2' - bromo-2-amino-4-methoxydiphenyl sulfide.

11. A process for the preparation of an amino-diphenyl sulfide which comprises partially reducing 2'-bromo-2-nitro-4-trifluoromethyldiphenylsulfide in the presence of an excess of sodium sulfide in an aqueous methanol solvent at a temperature in the range of from about 20° to about 30° C., thereafter effecting further reduction at a temperature in the range of from about 45° to about 70° C., and recovering the resultant 2'-bromo-2-amino-4-trifluoromethyldiphenyl sulfide.

References Cited by the Examiner

UNITED STATES PATENTS 3,004,028  10/1961  Dolliver et al. ____ 260—571 X
3,057,861  10/1962  Florey et al. _____ 260—571 X CHARLES B. PARKER, *Primary Examiner.*

ROBERT V. HINES, *Assistant Examiner.*